United States Patent [19]

Haerle

[11] Patent Number: 5,229,078
[45] Date of Patent: Jul. 20, 1993

[54] FILTER FOR THE SEPARATION OF IMPURITIES OR CONTAMINANTS

[75] Inventor: Hans A. Haerle, Bopfingen, Fed. Rep. of Germany

[73] Assignee: Schwaebische Huettenwerke GmbH, Fed. Rep. of Germany

[21] Appl. No.: 613,395

[22] Filed: Nov. 14, 1990

[30] Foreign Application Priority Data

Oct. 14, 1989 [DE] Fed. Rep. of Germany ....... 3937809

[51] Int. Cl.$^5$ .................. B01D 50/00; B01D 39/08; B01J 8/00
[52] U.S. Cl. ........................ 422/171; 422/180; 422/236; 422/238; 422/311; 55/511; 55/521; 55/DIG. 30
[58] Field of Search ............... 422/171, 180, 236, 238, 422/311; 55/DIG. 30, 511, 521

[56] References Cited

U.S. PATENT DOCUMENTS

| | | | |
|---|---|---|---|
| 3,161,478 | 12/1964 | Chessin | 428/613 |
| 3,306,353 | 2/1967 | Burne | 165/164 |
| 3,904,551 | 9/1975 | Lundsager et al. | 252/455 R |
| 4,062,807 | 12/1977 | Suzuki | 252/443 |
| 4,064,914 | 12/1977 | Grant | 138/142 |
| 4,329,162 | 5/1982 | Pitcher, Jr. | 55/523 |
| 4,359,864 | 11/1982 | Bailey | 55/DIG. 30 |
| 4,419,108 | 12/1983 | Frost et al. | 422/180 |
| 4,515,758 | 5/1985 | Domesle et al. | 423/213.2 |
| 4,652,286 | 3/1987 | Kusuda et al. | 55/523 |
| 4,662,915 | 5/1987 | Shirai et al. | 55/511 |
| 4,687,579 | 8/1987 | Bergman | 210/347 |
| 4,732,593 | 3/1988 | Kondo et al. | 55/523 |
| 4,758,272 | 7/1988 | Pierotti et al. | 75/246 |
| 4,760,047 | 7/1988 | Jeschke et al. | 502/439 |
| 4,889,630 | 12/1989 | Reinhardt et al. | 210/490 |
| 4,960,449 | 10/1990 | Yonushonis | 55/DIG. 30 |
| 4,971,769 | 11/1990 | Haerle | 422/171 |
| 4,981,172 | 1/1991 | Haerle | 165/133 |
| 5,009,857 | 4/1991 | Haerle | 422/177 |

FOREIGN PATENT DOCUMENTS

| | | |
|---|---|---|
| 42301 | 12/1981 | European Pat. Off. . |
| 0745462 | 3/1933 | France . |
| 0745465 | 3/1933 | France . |
| 1453653 | 9/1966 | France . |
| 2462188 | 2/1981 | France . |
| 54-128842 | 5/1979 | Japan . |
| 54-152241 | 11/1979 | Japan . |
| 61-287451 | 12/1986 | Japan . |
| 62-225221 | 10/1987 | Japan . |

Primary Examiner—Robert J. Warden
Assistant Examiner—Christopher Y. Kim
Attorney, Agent, or Firm—Welsh & Katz, Ltd.

[57] ABSTRACT

A filter for the separation of impurities or contaminants from a fluid or gaseous medium, especially of harmful components from the exhaust fumes of an internal combustion engine, with a filter body having a plurality of inlet and outlet channels, whereby the inlet channels are separated from the outlet channels by filter walls forming reaction spaces. The filter bodies consist of a plurality of compression molded, high-temperature-resistant filter plates which, arranged one above the other, form a plurality of flow channels between themselves. For the formation of inlet and outlet openings, the channels are each open on one filter body end face and closed on the opposite end face. The channel closure and the connection of adjacent filter plates takes place alternately on each end face by two adjacent filter plates being pushed into and tightly surrounded by stirrup parts which extend over and grip the entire width of the filter plate adjacent end edges.

15 Claims, 1 Drawing Sheet

FILTER FOR THE SEPARATION OF IMPURITIES OR CONTAMINANTS

TECHNICAL FIELD

The invention relates to a filter for the separation of impurities or contaminants from a fluid or gaseous medium, especially of harmful components from the exhaust fumes of an internal combustion engine, with a filter body having a plurality of inlet and outlet channels, whereby the inlet channels are separated from the outlet channels by filter walls forming reaction spacers.

BACKGROUND OF THE INVENTION

In particular, the exhaust fumes of internal combustion engines are increasingly being cleaned of the impurities or contaminants contained therein which are dangerous to health and to the environment. For example, in diesel engines soot filters of ceramic material are used, which are inserted into the exhaust system. The hot engine exhaust fumes flow into the inlet channels of the filter body, penetrate the porous filter walls surrounding the channels and are then again discharged through the outlet channels. Because of the high temperature, the soot, i.e., carbon, is transformed within the filter walls into gas and ash, which are then blown out of the exhaust system together with the exhaust fumes.

Ceramic filter bodies, however, have several disadvantages. In particular, they are sensitive to rapid changes of temperature, local overheating due to exhaust fumes, and jolts and knocks.

In the somewhat older West German Patent Application P 38 18 281 by the same applicant, an exhaust fume filter has already been suggested, in which the filter body consists of a plurality of compression molded, high temperature-resistant sintered elements. The individual sintered elements, which are of identical design, are jointly connected together into a filter body. The connection can take place, for example, by a sintering operation or by welding.

A connection by a sintering operation is relatively expensive, and the form is in this case finally determined. Weld connections are more adaptable and, where required, can also be subsequently modified. A disadvantage here, however, is that thermal stresses may occur during welding, and these may lead to corrosion problems.

SUMMARY OF THE INVENTION

The present invention is based on the problem of making a filter of the type mentioned, which can be manufactured as a continuous product very cheaply and, where necessary, automatically. This is highly variable with regard to its composition and, as the case may be, from changes, and itself has no negative effects on the filter body during assembly.

According to the invention this problem is solved by the fact that the filter body consists of a plurality of compression molded, high-temperature-resistant filter plates which, arranged one above the other, form a plurality of flow channels between each other. For the formation of inlet and/or outlet openings, the channels are each open on one end face of the filter and closed on the opposite end face. The closure and connection of each adjacent pair of filter plates takes place alternately on each filter end face. In each case, two adjacent filter plates are gripped over the end edges and are tightly held together by stirrup parts which extend over the entire length or width of the sintered plates.

Through the use of the stirrup parts (clamping elements) for connection of the individual filter plates to one another, whereby at the same time the channel end is also sealed off on the associated end face, filter plates can be piled one above the other in any desired number and then connected to each other by the stirrup parts. The connection may be made in various ways. A prerequisite is solely that at least fluid impermeable sealing (tightness) is achieved. For example, clamp connections can be provided.

This type of connection can be automated and thus is suitable for series a cheap or economical way. Likewise, in case of need, subsequent extensions or enlargement of the filter, and even an exchange or replacement of damaged or destroyed filter plates, is still possible.

The fluid permeable filter plates may consist of the most varied materials. For example, the plates can be advantageously designed as sintered plates, since because of the high temperature resistance such plates are very well suited. Likewise, however, compression molded filter plates manufactured on the welding principle can also be used. In the same way, a filter plate of compression molded wire braiding or fabric can be used.

In an advantageous way, the stirrup parts are made with high-temperature-resistant alloy components or manufactured of high-temperature-resistant material. The end faces of the filter and sintered plates facing the inlet side, which are, for example, exposed to a high thermal stress during cleaning of hot exhaust fumes or even of other hot media, are better protected in this way. If suitable high-temperature-resistant material or corresponding alloy components are used, risk of thermal cracks are avoided on a first impingement of hot exhaust fumes or hot fluids, since the stirrup parts can take up, dissipate or distribute the first "shock".

In a further very advantageous embodiment of the invention, provision can be made for the stirrup parts to be made of or coated with catalytically acting components.

If the filter according to the invention is used for catalytic cleaning the exhaust fumes of internal combustion engines, in this way further harmful exhaust fume components such as carbon monoxide, hydrocarbons and nitrogen oxide can be filtered out by reaction within the porous spaces of the filter walls.

Catalytically acting materials are widely known, such as, for example, platinum, rhodium or vanadium.

In a simple way the stirrup parts may be U-shaped bent molded parts which, for example, with suitable elasticity, are in each case clamped on over two end edges lying on each other from adjacent filter plates. It is of advantage if the filter plates are enclosed by sealing plates on the sides between the opposing stirrup parts.

In this way a lateral sealing is achieved, with the sealing plates simultaneously also being capable of being used for guiding during installation of the filter plates. The connection between the sealing plates and the filter plates can be made in any desired way.

It is of advantage if the stirrup parts are connected to the lateral sealing plates. The connection can be made in a simple way by, for example, welding. Since the filter plates are then not impaired by this or impaired only in the border areas, negative repercussions on the filter plates themselves are not to be expected.

In a further embodiment of the invention, provision can be made for a closure cover to be placed on a plurality of filter plates pressed one upon the other.

When the desired number of filter plates for a finished filter body has been selected, a closure cover can be provided on one, or where needed, on both sides for installation, whereby the closure cover is pressed with pressure onto the filter plates and subsequently a connection with the filter plates, or another part surrounding the filter plates, is created so that tightness between the individual filter plates is ensured. This applies particularly to the side section between the opposite stirrup parts.

The filter plates can be arranged in a flow housing, with the closure cover connected to the flow housing. In this case the sintered plates are piled one on top of the other in a housing and the cover is pressed on top as a closure, after which this is welded, for example, to the flow housing.

Thus, in a simple way a filter is created with a housing surrounding this assembled structure with an inlet and an outlet.

Instead of lateral sealing plates, the filter plates are also so designed laterally between the opposite stirrup parts that they are self-sealing. This can, for example, be done by means of sealing lips, allowing perfect tightness to be attained on connection under pre-stress, e.g. by a closure cover placed on top.

In a simple way the sealing lips can be formed with step-shaped shoulders in the filter plates.

Possibilities of application for the filter according to the invention are, in addition to the cleaning of exhaust fumes from internal combustion engines, of course, also other filters for the separation of impurities and contaminants from gaseous or fluid media, in particular, if these have high temperatures.

DESCRIPTION OF THE PREFERRED EMBODIMENTS

Figure 2:
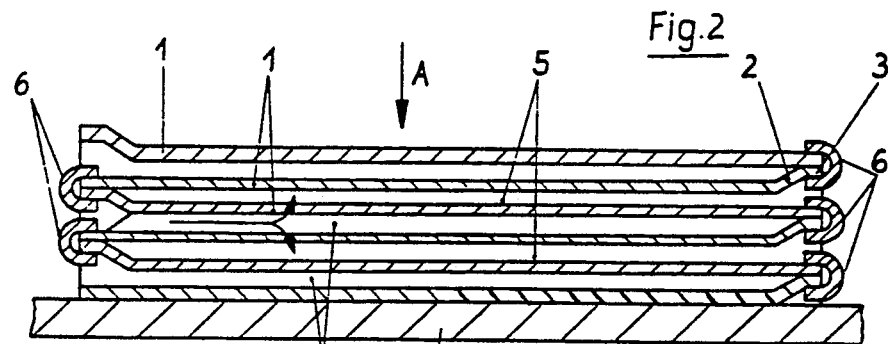
FIG. 2 is an enlarged schematic sectional representation of a portion of the filter plates according to FIG. 1.

The exemplified embodiments refer to a filter for the elimination or removal of components from exhaust fumes of an internal combustion engine. The filter is constructed from a plurality of compression molded, high-temperature-resistant filter plates 1, which are arranged one above the other, as best seen in FIG. 2. The filter plates may be sintered and have an undulated (wavy or corrugated) surface (see FIG. 4), and namely of such a type that flow channels result in the direction of flow. Each elevation of the undulations at the same time also forms spacers for the neighboring filter plate 1. The filter plates are designed identically, as best seen in FIG. 2, and each of them has at one end an end portion or face which represents a direct and straight extension of the filter area, whereas it has a bent section or bend 2 on the other side, which runs out in a straight end section or piece 3 that lies parallel to the surface of the filter plate.

For the production of a filter, the appropriate number of filter plates 1 is placed one above the other (FIG. 2) in such a way that one end portion or face of each plate lies with a straight part below an adjacent plate and the one face end with the bend 2 and the end piece 3 lines on top of another adjacent plate. In this way, not only flow channels are formed in each case between neighboring filter plates, but in each case alternately closures of the channels are achieved by the bends 2 and the end pieces 3. Thus, as seen most clearly in FIG. 2, the filter plates are laid upon each other in an alternating head-to-toe arrangement.

Figure 1:
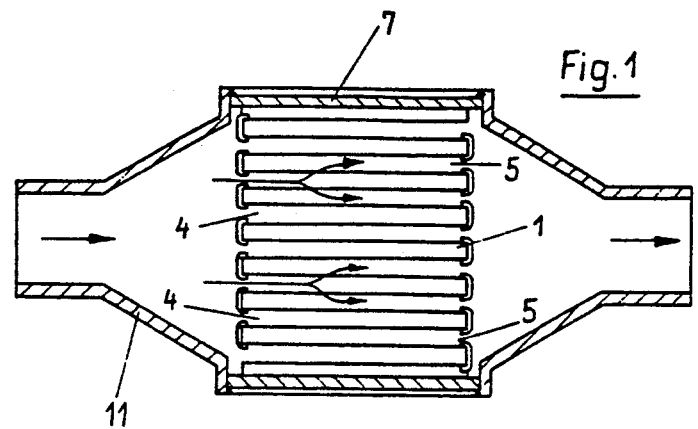
FIG. 1 is a simplified schematic longitudinal view, shown partially in section, illustrating a filter arranged in a housing.

As can be seen particularly from FIG. 2, this means that the inlet channels 4, which are on the left as per the indicated direction of flow in FIG. 1, which is shown by arrows, are therefore sealed off on the right-hand side. On the other hand, outlet channels 5, which are open on the right side, as seen in FIGS. 1 and 2, are sealed off on the ingoing side. This means that, for cleaning, the medium must in each case, see the arrows in FIG. 1, penetrate the walls of the filter plates, which thereby form reaction spaces, leading to the desired separations and reactions.

For durable or permanent connection and for sealing, stirrup parts 6 are each pushed over a pair of face ends consisting of a straight end face and an end piece 3 with the bend 2, these stirrup pieces 6 being designed as U-shaped bent molded parts. The stirrup parts are made of a high-temperature-resistant material and possess such elasticity that they are pushed onto the end edges of adjacent filter plates 1 under stress, so that sealing is accomplished and at the same time also a firm or permanent clamping connection of the pile of filter plates is ensured.

Figure 3:
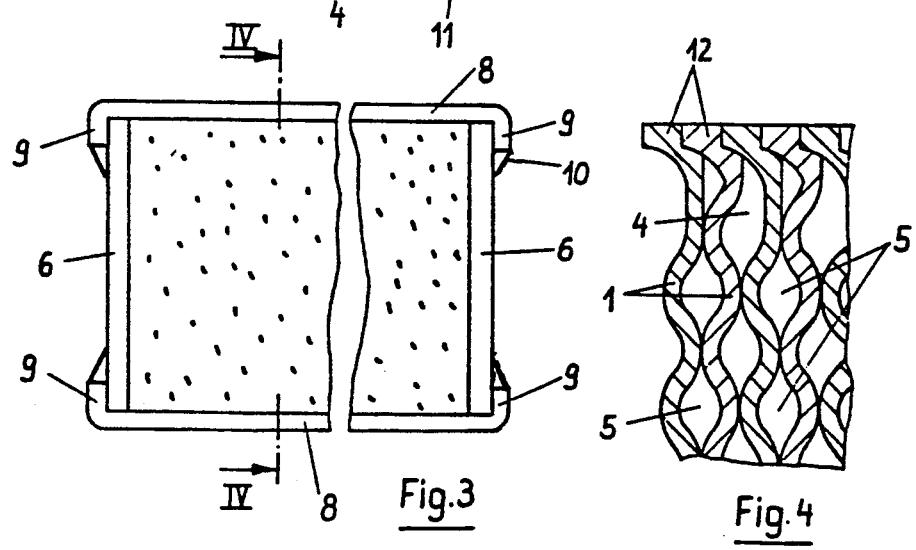
FIG. 3 is a plan view, seen in direction A of FIG. 2, showing a filter plate (on a reduced scale).

In order that the filter plates are also tight at the side walls between the opposite stirrup parts 6, after a piling of the filter plates 1 one above the other, a corresponding pressure is exerted on them and then a closure cover 7 is placed on top (FIG. 1) and connected to the filter plates or to lateral sealing plates 8 (see FIG. 3).

The lateral sealing plates 8 preferably possess in each case angled pieces 9 directed inwardly on the end edges of the filter plates 1 facing the stirrup parts 6. The angled pieces 9 serve on the one hand for guiding the filter plates 1 during installation and, on the other hand, the stirrup pieces 6 can also be fastened to the angled pieces, as by being welded on. Corresponding weld seams 10 are shown in FIG. 3.

If the filter is built into a flow housing, the filter formed from the filter plates 1 can be inserted correspondingly into the flow housing 11, as best seen in FIG. 1, whereupon the stirrup parts 6, the closure cover 7 can also be fastened to the flow housing 11 itself, after application of a pre-stress onto the filter plates, by welds.

At least the stirrup parts 6 arranged on the inlet side, which are exposed particularly intensely to the inflowing hot exhaust fumes, are to be made of a correspondingly high-temperature-resistant material. In addition, these stirrup parts 6 can also be made of a catalytically acting material.

Figure 4:
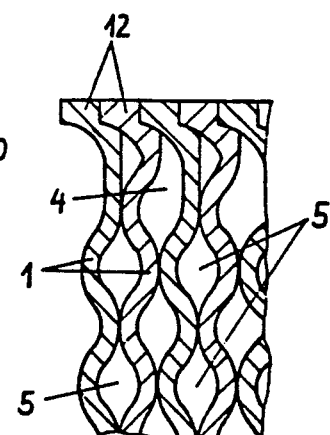
FIG. 4 is a schematic sectional view taken along Line IV—IV of FIG. 3, showing a portion of adjacent filter plates in an enlarged representation without showing the adjacent side walls.

Instead of lateral sealing plates 8, the filter plates 1 can, where required, also be designed in their lateral areas so that they each form sealing lips 12 between each other. Such an embodiment is shown in FIG. 4, where the sealing lips 12 are shown to be designed with mating step-shaped shoulders on the right side. If the filter plates 1 are pressed together during assembly, as stated above, in this way fluid tight sealing is ensured.

Filter plates 1 as sintered plates are formed in the well-known way in a sintering operation after a previous compression molding. Metal powder or dust, metal wires or metal chips can be used as basic material for the molded and sintered plate. To obtain a sufficiently high porosity, either coarse metal powder or, in a preferable way, metal wires or metal chips are used, which may have lengths of 1-10 mm. It goes without saying that, in case of need, other dimensional sizes are also possible.

I claim:

1. Filter for the separation of impurities or contaminants from a fluid or gaseous medium, such as the harmful components from the exhaust fumes of an internal combustion engine, said filter comprising a plurality of compression molded, high-temperature-resistant filter plates arranged one above the other to form a plurality of inlet channels and flow outlet channels between themselves with no intervening structure between said filter plates, with the channels each open on one filter body end face for the formation of inlet and/or outlet openings and each closed on the opposite filter body end face, and the channel closure and connection of adjacent filter plates taking place alternately on each filter end face by in each case two adjacent filter plates being pushed into and surrounded by stirrup parts which extend over and grip the entire edge of the filter plate adjacent end edge, to effect a fluid impermeable seal at said end edges.

2. Filter according to claim 1, wherein the filter plates are sintered plates.

3. Filter according to claim 1, wherein the stirrup parts are U-shaped bent molded parts.

4. Filter according to claim 1, wherein the filter plates are surrounded by sealing plates at the sides of the filter plates and between the opposing stirrup parts.

5. Filter according to claim 4, wherein the stirrup parts are connected to the sealing plates.

6. Filter according to claim 1, wherein a closure cover is placed on a plurality of filter plates pressed onto one another.

7. Filter according to claim 6, wherein the closure cover is fastened to sealing plates which are located at the sides of the plurality of filter plates.

8. Filter according to claim 7, wherein the sealing plates have guide means directed inwardly to cover outer portions of the filter body end faces.

9. Filter according to claim 6, wherein the filter plates are arranged in a flow housing, and the closure cover is connected to the flow housing.

10. Filter according to claim 1, wherein the filter plates are provided with sealing lips at the side edges between the stirrup parts.

11. Filter according to claim 10, wherein the sealing lips are formed with shoulders at the side edges of the filter plates.

12. Apparatus for the separation of impurities or contaminants from a fluid medium, such as the harmful components from the exhaust fumes of an internal combustion engine, said apparatus comprising a plurality of filter plates having a first end portion which is an extension of the filter wall of the filter plate and a second end portion which comprises a straight end section parallel to the first end portion and off-set therefrom by a bent section, with said plurality of filter plates being arranged one above the other in an alternating head-to-toe arrangement with no intervening structure between said filter plates to provide that said first end portion of a given filter plate is adjacent the straight end section of an adjacent plate and the straight end section of said given filter plate is adjacent the first end portion of another adjacent plate forming said inlet and outlet channels therebetween, said first end portion of said given filter plate and the adjacent straight end section of an adjacent filter plate being gripped in a fluid sealing engagement by a stirrup element extending substantially the width of said end with all inlet channels thereby open on a first end face of said filter body and closed on a second end face of said filter body, and with all outlet channels thereby open on said second end face of said filter body and closed on said first end face.

13. Apparatus according to claim 12, wherein the filter plates are provided with sealing lips at the side edges.

14. Apparatus according to claim 13, wherein the sealing lips are formed with shoulders at the side edges of the filter plates.

15. Apparatus according to claim 12, wherein said filter plates have an undulated surface.

* * * * *